(12) United States Patent
Wen et al.

(10) Patent No.: US 11,244,548 B2
(45) Date of Patent: Feb. 8, 2022

(54) SYSTEM AND METHOD FOR ANTI-SHOPLIFTING IN SELF-CHECKOUT

(71) Applicants: Beijing Jingdong Shangke Information Technology Co., Ltd., Beijing (CN); JD.com American Technologies Corporation, Mountain View, CA (US)

(72) Inventors: Longyin Wen, Sunnyvale, CA (US); Yue Zhang, Mountain View, CA (US); Xinyao Wang, Union City, CA (US); Lei Yi, Fremont, CA (US); Liefeng Bo, Sunnyvale, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 172 days.

(21) Appl. No.: 16/808,306

(22) Filed: Mar. 3, 2020

(65) Prior Publication Data
US 2021/0280027 A1    Sep. 9, 2021

(51) Int. Cl.
*G08B 13/196*    (2006.01)
*G06Q 20/18*    (2012.01)
(Continued)

(52) U.S. Cl.
CPC ..... *G08B 13/19608* (2013.01); *G06K 9/2054* (2013.01); *G06N 3/08* (2013.01);
(Continued)

(58) Field of Classification Search
CPC .. G06K 9/00771; G06K 9/2054; G06Q 20/18; G06T 2207/10016; G08B 13/19608
See application file for complete search history.

(56) References Cited

U.S. PATENT DOCUMENTS 7,035,440 B2 *   4/2006   Kaku ............... G03B 15/00
                                                     382/115
7,472,134 B2 *  12/2008   Kaku ............... G06Q 30/02
(Continued)

FOREIGN PATENT DOCUMENTS

CN    107426535 A    12/2017
CN    206893032 U     1/2018

OTHER PUBLICATIONS

Mark Sandler, Andrew Howard, Menglong Zhu, Andrey Zhmoginov, Liang-Chieh Chen, MobileNetV2: inverted residuals and linear bottlenecks, IEEE/CVF Conference on Computer Vision and Pattern Recognition (CVPR), 2018, 4510-4520.
(Continued)

*Primary Examiner* — Gandhi Thirugnanam
(74) *Attorney, Agent, or Firm* — China Science Patent & Trademark US LLC; Shanyun Lu

(57) ABSTRACT

A method and a system for self-checkout. The system includes a scanner, an imaging device, and a computing device. The computing device is configured to: initiate a self-checkout event; instruct the imaging device to capture video frames of a region of interest (ROI); track the product; record scanning status and location status of the product; in response to receive a scanning signal from the scanner, record scanning status of the product as scanned; calculate a shoplifting risk score based on a number of the product having the scanning status of unscanned and disappears from the table region or ROI; and provide a shoplifting warning when the shoplifting score is large.

20 Claims, 8 Drawing Sheets

(51) Int. Cl.
  *G06N 3/08* (2006.01)
  *G06K 9/20* (2006.01)
  *G06T 7/20* (2017.01)

(52) U.S. Cl.
  CPC ............... *G06Q 20/18* (2013.01); *G06T 7/20* (2013.01); *G06T 2207/10016* (2013.01); *G06T 2207/20084* (2013.01)

(56) References Cited

U.S. PATENT DOCUMENTS

| | | |
|---|---|---|
| 9,124,778 B1* | 9/2015 | Crabtree ........... G08B 13/19608 |
| 10,713,493 B1* | 7/2020 | Huang .................... G06N 20/10 |
| 2007/0182818 A1* | 8/2007 | Buehler ........... G08B 13/19641 348/143 |
| 2013/0278425 A1* | 10/2013 | Cunningham ....... G08B 13/242 340/572.1 |
| 2016/0127931 A1* | 5/2016 | Baxley .................. H04W 12/08 455/67.16 |
| 2018/0096332 A1* | 4/2018 | O'Herlihy ............. G06Q 20/209 |
| 2018/0218224 A1* | 8/2018 | Olmstead ......... G08B 13/19643 |
| 2019/0258870 A1* | 8/2019 | Kundu ................. G06Q 20/403 |
| 2019/0258890 A1* | 8/2019 | Lee ....................... G06T 7/0004 |
| 2019/0378389 A1* | 12/2019 | Altuev ............. G08B 13/19697 |
| 2020/0234056 A1* | 7/2020 | Pricochi ............. G06K 9/00355 |
| 2020/0258067 A1* | 8/2020 | O'Herlihy ............ G07G 1/0081 |
| 2020/0380833 A1* | 12/2020 | Kamio ..................... G07C 9/10 |
| 2021/0280027 A1* | 9/2021 | Wen ..................... G06K 9/2054 |

OTHER PUBLICATIONS

Liang-Chieh Chen, Yukun Zhu, George Papandreou, Florian Schroff, Hartwig Adam, Encoder-decoder with atrous separable convolution for semantic image segmentation, European Conference on Computer Vision (ECCV), 2018, 833-851.

Shaoqing Ren, Kaiming He, Ross Girshick, Jian Sun, Faster R-CNN: towards real-time object detection with region proposal net-works, TPAMI, 2017, 39(6):1137-1149.

Kaiming He, Georgia Gkioxari, Piotr Dollár, Ross Girshick, Mask R-CNN, IEEE International Conference on Computer Vision (ICCV), 2017, 2980-2988.

Shifeng Zhang, Longyin Wen, Xiao Bian, Zhen Lei, Stan Z. Li, Single-shot refinement neural network for object detection, IEEE Conference on Computer Vision and Pattern Recognition (CVPR), 2018, 4203-4212.

J. Henriques, R. Caseiro, P. Martins, and J. Batista, High-speed tracking with kernelized correlation filters, TPAMI, 2015, 37(3): 583-596.

Martin Godec, Peter M. Roth, Horst Bischof, Hough-based tracking of non-rigid objects, IEEE International Conference on Computer Vision (ICCV), 2011, 81-88.

International Searching Authority, International search report and the written opinion for international application No. PCT/CN2021/078887, dated Jun. 2, 2021.

\* cited by examiner

SYSTEM AND METHOD FOR ANTI-SHOPLIFTING IN SELF-CHECKOUT

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to self-checkout techniques, and more particularly to systems and methods of self-checkout that uses visual information to prevent shoplifting.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Self-checkout (also known as self-service checkout or semi-attended customer-activated terminal (SACAT)) machines provide service for customers to process their own purchases from a retailer. It is an alternative to the traditional cashier-staffed checkout. That is, the customer performs the job of the cashier themselves, by scanning and applying payment for the items. Self-checkout is vulnerable to some shoplifting, causing a lot of losses to the retailer. For example, a person may directly take the item without scanning. To that end, some stores decide to install a surveillance system and hire some staffs to monitor shoplifters. However, it is difficult for the staffs to concentrate on monitoring multiple self-checkout machines at all times.

Therefore, an unaddressed need exists in the art to address the aforementioned deficiencies and inadequacies.

SUMMARY

In certain aspects, the present disclosure relates to a system for self-checkout. The system includes a scanner, an imaging device, and a computing device. The computing device includes a processor and a storage device storing computer executable code. The computer executable code, when executed at the processor, is configured to:

initiate a self-checkout event;

instruct the imaging device to capture video frames of a region of interest (ROI), where the ROI includes a table region for placing a product, and the table region includes a scanning region for scanning the product;

track the product in the video frames;

record scanning status and location status of each of the product, wherein the scanning status includes scanned and unscanned, the default scanning status is unscanned, and the location status includes in the scanning region, in the table region (including "on the table" where the product is placed on top surface of the table and is in contact with the top surface of the table, and "above the table" where the product is in the air above the top surface of the table and is not in contact with the table surface), and out of the table region but within the ROI;

in response to receiving a scanning signal from the scanner when the product is placed in the scanning region, record scanning status of the tracked product from unscanned to scanned;

calculate a shoplifting risk score based on a number of the product having the scanning status of unscanned and disappear from the table region or the ROI; and provide a shoplifting warning when the shoplifting score is greater than a predetermined value.

In certain embodiments, the computer executable code is configured to track all the products that have been observed in the video frames. In certain embodiments, the computer executable code may be configured to only track the products that have been scanned.

In certain embodiments, the computer executable code is configured to initiate a self-checkout event when the customer touches "Start" on a touchscreen of the computing device, or when the customer starts scanning a product, or the customer scans his membership card.

In certain embodiments, the step of calculating a shoplifting risk score is performed after the computing device receives an instruction from a payment device indicating that the self-checkout event has been completed, or after the computing device receives a signal because the customer touched "End" on the touchscreen of the computing device, or after both the actions. In certain embodiments, the step of calculating a shoplifting risk score may also be delayed for a short period of time after the checkout event has been completed, or until the customer leaves the ROI. In certain embodiments, the computer executable code may be configured to process recorded video and the corresponding scanning information after an extended time period.

In certain embodiments, the computer executable code is configured to, before track the product: segment the video frames such that each pixel of the video frames is labeled with hand of a customer, product in hand, product on table, and background; and detect the product in hand and the product on table based on the labels of the pixels. In certain embodiments, the object detection methods, e.g. Mask R-CNN, Faster R-CNN, and RefineDet, can be used to detect the product in hand or on the table.

In certain embodiments, the computer executable code is configured to segment and detect using a deep convolutional neural network (CNN).

In certain embodiments, the computer executable code is configured to track the product using tracking-by-detection and greedy search when the product is the product in hand, and track the product using appearance based tracker when the product is the product on table.

In certain embodiments, the shoplifting risk score R is calculated by: $R = r_1 \times N_1 + r_2 \times N_2$. $N_1$ is a number of the product that has the scanning status of unscanned and disappears from the table region, and $N_2$ is a number of the product that has the scanning status of unscanned and disappears from the ROI, $r_1$ is a medium risk factor, and $r_2$ is a high risk factor.

In certain embodiments, the medium risk factor is in a range of about 0.5-1.0, and the high risk factor is in a range of about 1.0-2.0. In certain embodiments, the high risk factor is set at about two times of the medium risk factor.

In certain embodiments, the computer executable code is further configured to: provide the shoplifting warning that shoplifting happened when $R \geq \beta_1 \times (N_3)^\alpha$; and provide the shoplifting warning that shoplifting might happened when $\beta_1 \times (N_3)^\alpha > R \geq \beta_2 \times (N_3)^\alpha$. $N_3$ is a number of the product that has the scanning status of scanned, $\alpha$ is a predetermined number in a range of about 0.2-1.0, $\beta_1$ is a predetermined number in a range of about 1.0-2.0, and $\beta_2$ is a predetermined number in a range of about 0.5-1.0. When $R < \beta_2 \times (N_3)^\alpha$, the computer executable code is configured to keep silent or send a notice that no shoplifting happened.

In certain embodiments, the computer executable code is further configured to: provide a scan difficulty message when the product is placed in the scanning region and has the scanning status of unscanned, and the computing device has not received a scanning signal of the product from the scanner for an accumulated time greater than a predetermined time.

In certain embodiments, the predetermined time is in a range of about 2-15 seconds. In certain embodiments, the predetermined time is 3-5 seconds. In certain embodiments, the predetermined time is 3 or 5 seconds. In certain embodiments, the predetermined time may be configured according to a retailer's need.

In certain embodiments, the imaging device is a red green blue-depth (RGBD) camera.

In certain embodiments, the computing device is an embedded device. In certain embodiments, the computing device is a cloud device.

In certain aspects, the present disclosure relates to a method for self-checkout. In certain embodiments, the method includes:

initiating, by a computing device, a self-checkout event;

instructing, by the computing device, an imaging device to capture video frames of a region of interest (ROI), where the ROI includes a table region for placing a product, and the table region includes a scanning region for scanning the product;

tracking, by the computing device, the product in the video frames;

recording, by the computing device, scanning status and location status of each of the product, where the scanning status includes scanned and unscanned, the default scanning status is unscanned, and the location status includes in the scanning region, in the table region, and out of the table region but within the ROI;

in response to receiving a scanning signal from a scanner when the product is placed in the scanning region, recording, by the computing device, scanning status of the tracked product from unscanned to scanned;

calculating a shoplifting risk score based on a number of the product having the scanning status of unscanned and disappears from the table region or the ROI; and providing a shoplifting warning when the shoplifting risk score is greater than a predetermined value.

In certain embodiments, the method further includes, before the step of tracking the product: segmenting, by the computing device, the video frames such that each pixel of the video frames is labeled with hand of a customer, product in hand, product on table, and background; and detecting, by the computing device, the product in hand and the product on table based on the labels of the pixels.

In certain embodiments, at least one of the steps of segmenting and detecting is performed using a deep convolutional neural network (CNN).

In certain embodiments, the step of tracking the product is performed using tracking-by-detection and greedy search when the product is the product in hand, and performed using appearance based tracker when the product is the product on table.

In certain embodiments, the shoplifting risk score R is calculated by: $R = r_1 \times N_1 + r_2 \times N_2$, where $N_1$ is a number of the product that has the scanning status of unscanned and disappears from the table region, $N_2$ is a number of the product that has the scanning status of unscanned and disappears from the ROI, $r_1$ is a medium risk factor in a range of about 0.5-1.0; and $r_2$ is a high risk factor in a range of about 1.0-2.0.

In certain embodiments, the method further includes: providing the shoplifting warning that shoplifting happened when $R \geq \beta_1 \times (N_3)^\alpha$; and providing the shoplifting warning that shoplifting might happened when $\beta_1 \times (N_3)^\alpha > R \geq \beta_2 \times (N_3)^\alpha$. $N_3$ is a number of the product that has the scanning status of scanned, a is a predetermined number in a range of about 0.2-1.0, $\beta_1$ is a predetermined number in a range of about 1.0-2.0, and $\beta_2$ is a predetermined number in a range of about 0.5-1.0. When $R < \beta_2 \times (N_3)^\alpha$, the computer executable code is configured to keep silent or send a notice that no shoplifting happened.

In certain embodiments, the method further includes: providing a scan difficulty message when the product is placed in the scanning region and has the scanning status of unscanned, and the computing device has not received a scanning signal of the product from the scanner for an accumulated time greater than a predetermined time.

In certain embodiments, the imaging device is a red green blue-depth (RGBD) camera. In certain embodiments, the computing device is an embedded device or a cloud device.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1:
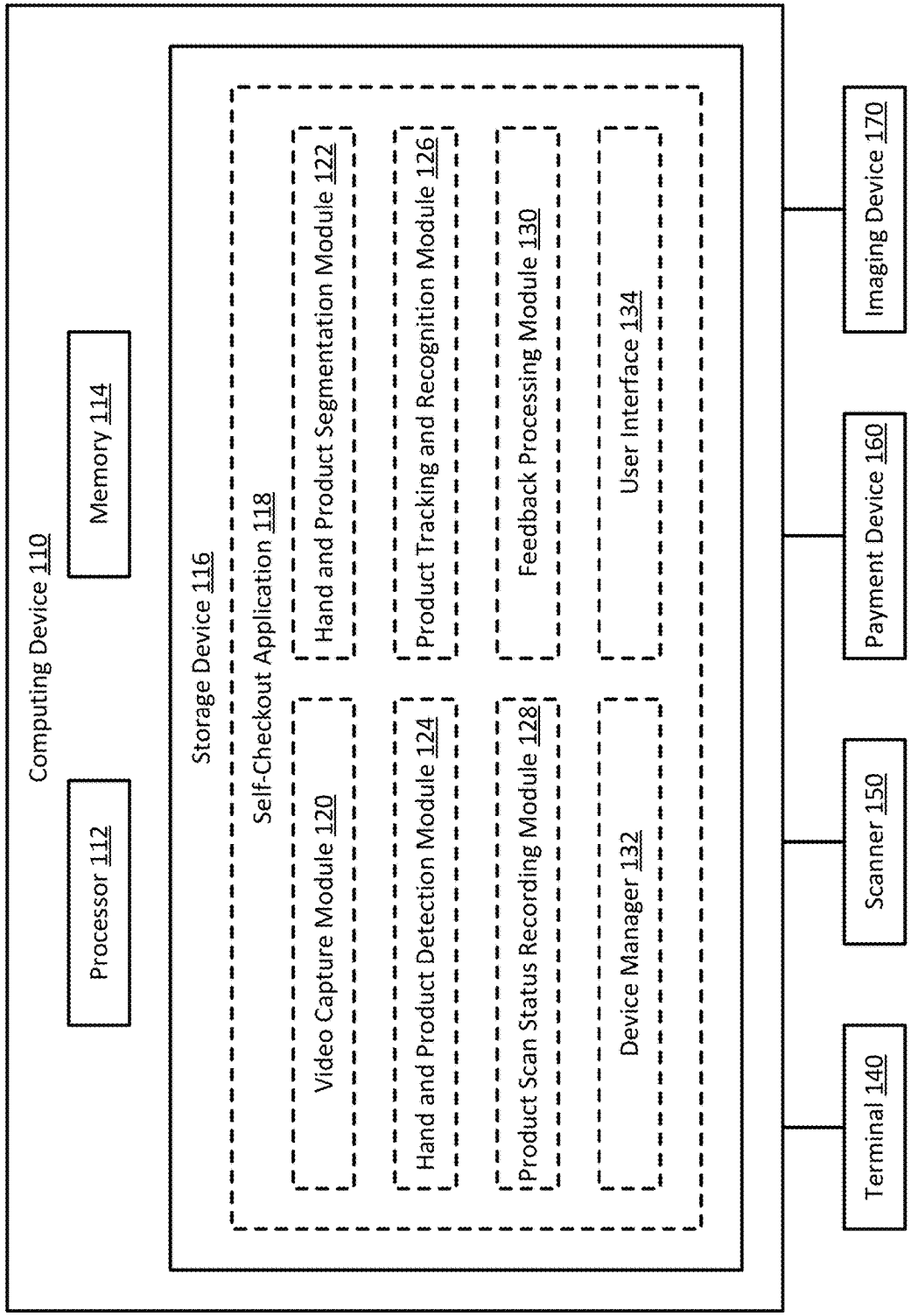
FIG. 1 schematically depicts an anti-shoplifting, self-checkout system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, the present disclosure relates to self-checkout systems and methods that have functions of detecting scan difficulty and detecting shoplifting actions. In certain embodiments, the disclosure provides a visual solution and algorithm for intelligent anti-shoplifting self-checkout apparatus, which acts as a cashier to interact with customers by providing instructions or assistance, and monitor the actions of customers to deter them from shoplifting. For example, if a customer encounters a problem that a coupon is not accepted or there is scanning difficulty of an item, the system is able to provide some instructions or inform the staffs in store to provide corresponding help. If customers are aware of being monitored by the system, they will scan the items carefully. Notably, the system according to certain embodiments of the disclosure is able to run on embedded devices, which is lightweight and low cost for retailers. In summary, by detecting, tracking and understanding actions of customers, certain embodiments of the present disclosure construct an intelligent anti-shoplifting self-checkout system.

FIG. 1 schematically depicts an anti-shoplifting, self-checkout system according to certain embodiments of the present disclosure. As shown in FIG. 1, the system 100 includes a computing device 110, a terminal 140, a scanner 150, a payment device 160, and an imaging device 170. The terminal 140, the scanner 150, the payment device 160 and the imaging device 170 are in communication with the computing device 110. In certain embodiments, the computing device 110 may be a server computer, a cluster, a cloud computer, or a general-purpose computer, which manages the self-checkout system. In certain embodiments, the computing device 110 is preferably a specialized computer with limited processing, memory and storage capacity, which reduces cost of the system 100 while still has sufficient power to implement the functions of the system 100. In certain embodiments, the computing device 110 is an embedded device. In certain embodiments, the communication is performed via a network, which may be a wired or wireless network, and may be of various forms, such as a public network and a private network, or via non-transitory computer media including but not limited to flash drive, USB drives, hard drive, floppy disk, SD card, optical drive, or any other portable data storage media. In certain embodiments, the computing device 110 provides an user interface for configuring parameters of the computing device 110, the terminal 140, the scanner 150, the payment device 160, and the imaging device 170, or configuring or managing the communications between the devices 110, 140, 150, 160 and 170.

Figure 2:
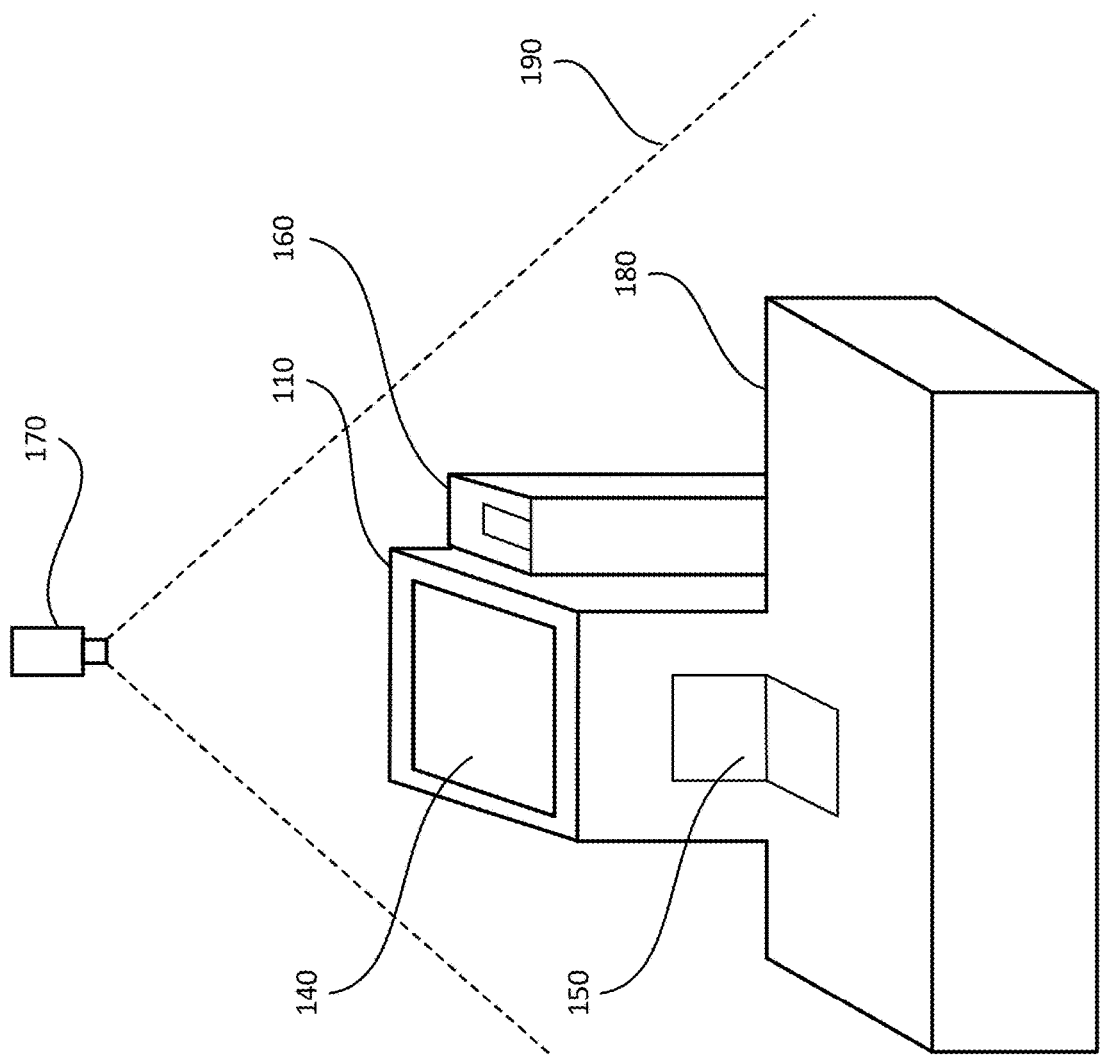
FIG. 2 schematically depicts an implementation of an anti-shoplifting, self-checkout system according to certain embodiments of the present disclosure.
Figure 3:
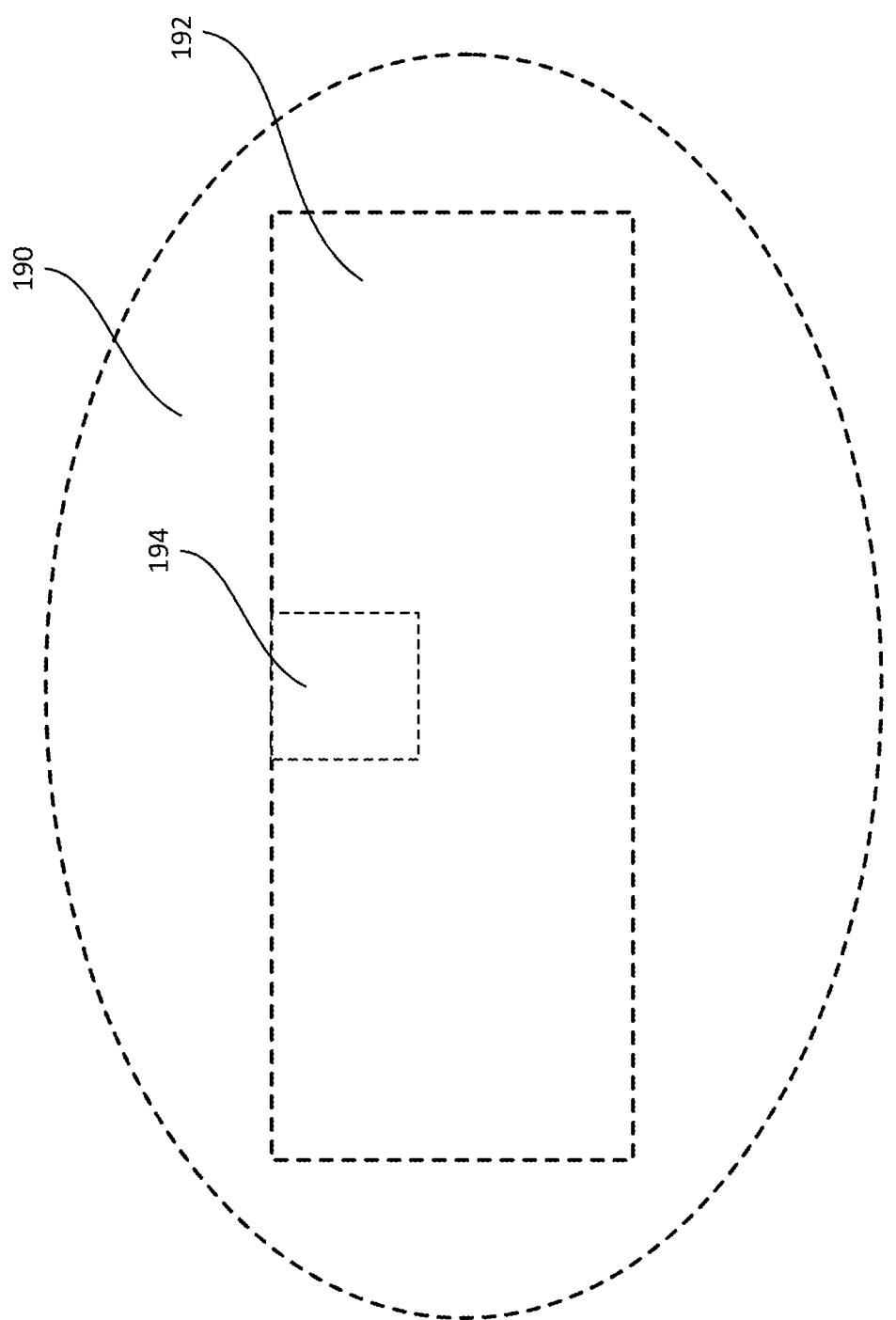
FIG. 3 schematically depicts a top view of the implementation of FIG. 2.

FIG. 2 schematically depicts an implementation of an anti-shoplifting, self-checkout system according to certain embodiments of the present disclosure. As shown in FIG. 2, the computing device 110, the terminal 140, and the scanner 150 are integrally formed, and are placed next to a table 180. The payment device 160 is located next to the computing device 110 and is optionally integrated with the computing device 110, the terminal 140 and the scanner 150. The imaging device 170 is installed above the terminal 140, and can take images of a region of interest (ROI) 190. Referring to FIG. 3, in the top view of the implementation in FIG. 2, the ROI 190 may be in a cone shape depending on the type and parameters of the imaging device 170. The ROI 190 includes a table region 192. The table region 192 includes top surface of the table 180 and the space directly above the table 180, and top edge of the table region 192 is limited by the ROI or a predetermined height. The table region 192 includes a scanning region 194 corresponding to the scanner 150. The scanning region 194 may be a space in a shape of cuboid or cube, and products can be scanned in the scanning region 194 by the scanner 150. The table 180 shown in FIG. 2 has a flat top surface. In other embodiments, the table 180 may also be formed with different parts at different height levels, so as to ease the operation of the product by the customers.

Figure 4:
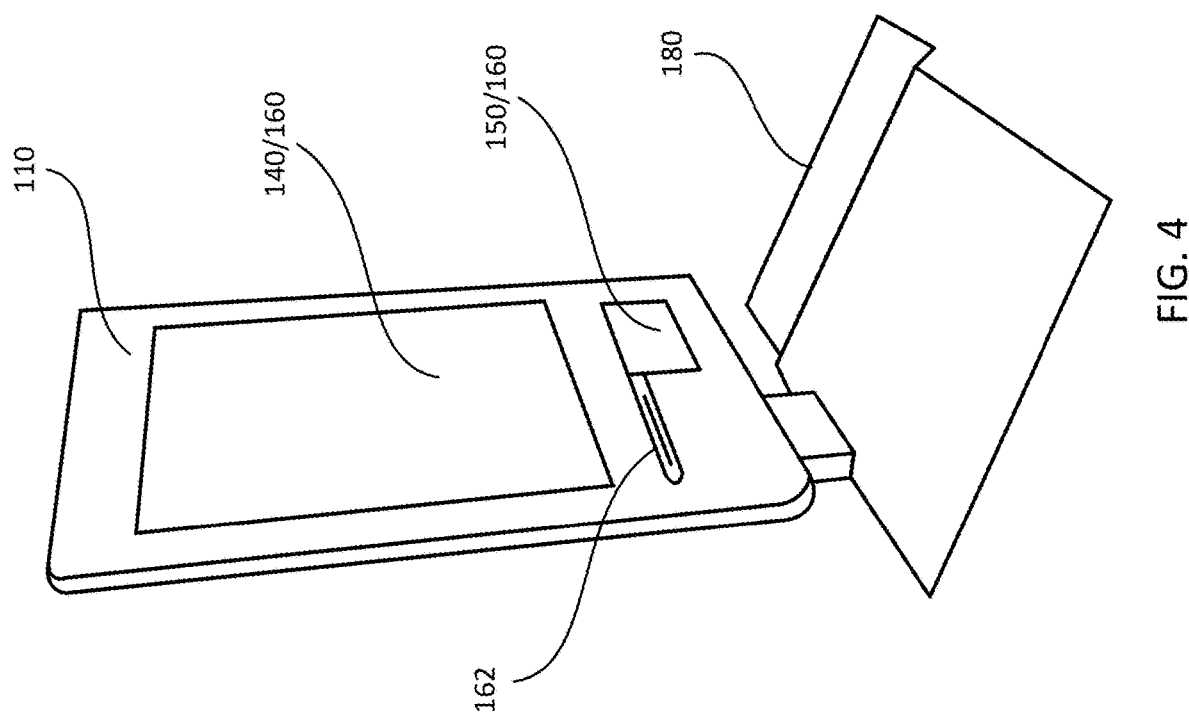
FIG. 4 schematically depicts an implementation of an anti-shoplifting, self-checkout system according to certain embodiments of the present disclosure.

FIG. 2 and FIG. 3 schematically depict the implementation according to certain embodiments of the present disclosure, and the present disclosure is not limited to the structure as shown. For example, FIG. 4 schematically depicts another variation of the implementation (the camera 170 is above the table region and is not shown). As shown in FIG. 4, the computing device 110, the terminal 140, the scanner 150, and the payment device 160 are integrally formed. The terminal 140 provides the payment interface, and the payment information, such as a code or an e-credit card on a smartphone, can be read by the scanner 150. Further, as shown in FIG. 4, the table 180 is divided into two parts for customer's convenience. The table region 192 can still be defined for example as the 3D space vertically above the two parts of the table 180 and have a limited height, and a product can be determined to be on the table (in touch with the table 180) or above the table (in the air above the table 180 but not in touch with the table 180) using the RGBD images.

Furthermore, the bottom of the 3D scanning region 194 may be above the surface of the table 180 for a small distance and does not overlap with the table surface. In addition, the system may further include a printing module incorporated in the computing device 110 for printing a receipt. The touch screen 140 provides an printing interface, and a receipt can be printed out through a printer 162.

Referring back to FIG. 1, the computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. The processor 112 can execute an operating system (OS) or other applications of the computing device 110. In some embodiments, the computing device 110 may have more than one CPU as the processor, such as two CPUs, four CPUs, eight CPUs, or any suitable number of CPUs. The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114. The storage device 116 is a non-volatile data storage media for storing the OS (not shown) and other applications of the computing device 110.

Examples of the storage device 116 may include non-volatile memory such as flash memory, memory cards, USB drives, hard drives, floppy disks, optical drives, solid-state drive (SSD) or any other types of data storage devices. In certain embodiments, the storage device 116 may be a local storage, a remote storage, or a cloud storage. In certain embodiments, the computing device 110 may have multiple storage devices 116, which may be identical storage devices or different types of storage devices, and the applications of the computing device 110 may be stored in one or more of the storage devices 116 of the computing device 110. In certain embodiments, the computing device 110 is a cloud computer, and the processor 112, the memory 114 and the storage device 116 are shared resources provided over the Internet on-demand. In certain embodiments, the computing device 110 is an embedded system that designed for self-checkout, and may contain microprocessor with integrated memory and peripheral interfaces, or contain ordinary microprocessors.

As shown in FIG. 1, the storage device 116 includes a self-checkout application 118. The self-checkout application 118 is configured to provide self-checkout service to customers which enables scan assistance function and anti-shoplifting function. The self-checkout application 118 includes a video capture module 120, a hand and product segmentation module 122, a hand and product detection module 124, a product tracking and recognition module 126, a product scanning status recording module 128, a feedback processing module 130, a device manager 132, and a user interface 134. In certain embodiments, the self-checkout application 118 may include other applications or modules necessary for the operation of the self-checkout application 118. It should be noted that the modules are each implemented by computer executable codes or instructions, which collectively forms one application. In certain embodiments, each of the modules may further include sub-modules. Alternatively, some of the modules may be combined as one stack. In other embodiments, certain modules may be implemented as a circuit instead of executable code, and the computing device 110 may be implemented by a simple circuit board with other accessory components installed on the circuit board. In certain embodiments, some or all of the modules of the self-checkout application 118 may be located at a remote computing device or distributed in a cloud.

A self-checkout event starts when a customer clicks "Start" on the terminal 140, or scans a first product using the scanner 150, or scans a membership card using the scanner 150. The computing device 110 is configured to, upon receiving a signal on clicking the "Start" from the terminal 140 or receiving a scanning signal of the first product or the membership card from the scanner 150, initialize the execution of the self-checkout application 118. The signal may be named an initialization signal.

The video capture module 120 is configured to, upon receiving the initialization signal or upon execution of the self-checkout application 118, instruct the imaging device 170 to capture video frames of the three-dimensional region of interest (ROI) 190, and send the captured video frames to the hand and product segmentation module 122 and optionally to the hand and product detection module 124. In certain embodiments, the ROI 190 may cover the self-checkout area of one or more self-checkout machines. In certain embodiments, the ROI 190 may include the table region 192 and regions around the table 180. In certain embodiments, the regions around the table 180 covered by the ROI 190 may be limited, and may or may not cover a shopping cart or a shopping bag, or parts thereof. The video frames may be red green blue-depth (RGBD) frames, red green blue (RGB) frames, or black and white frames. In certain embodiments, the imaging device 170 is an RGBD camera, and the depth information from the captured RGBD frames can be used to determine whether a product is placed on and in contact with the top surface of the table 180 or in the hands of the customer.

Figure 5:
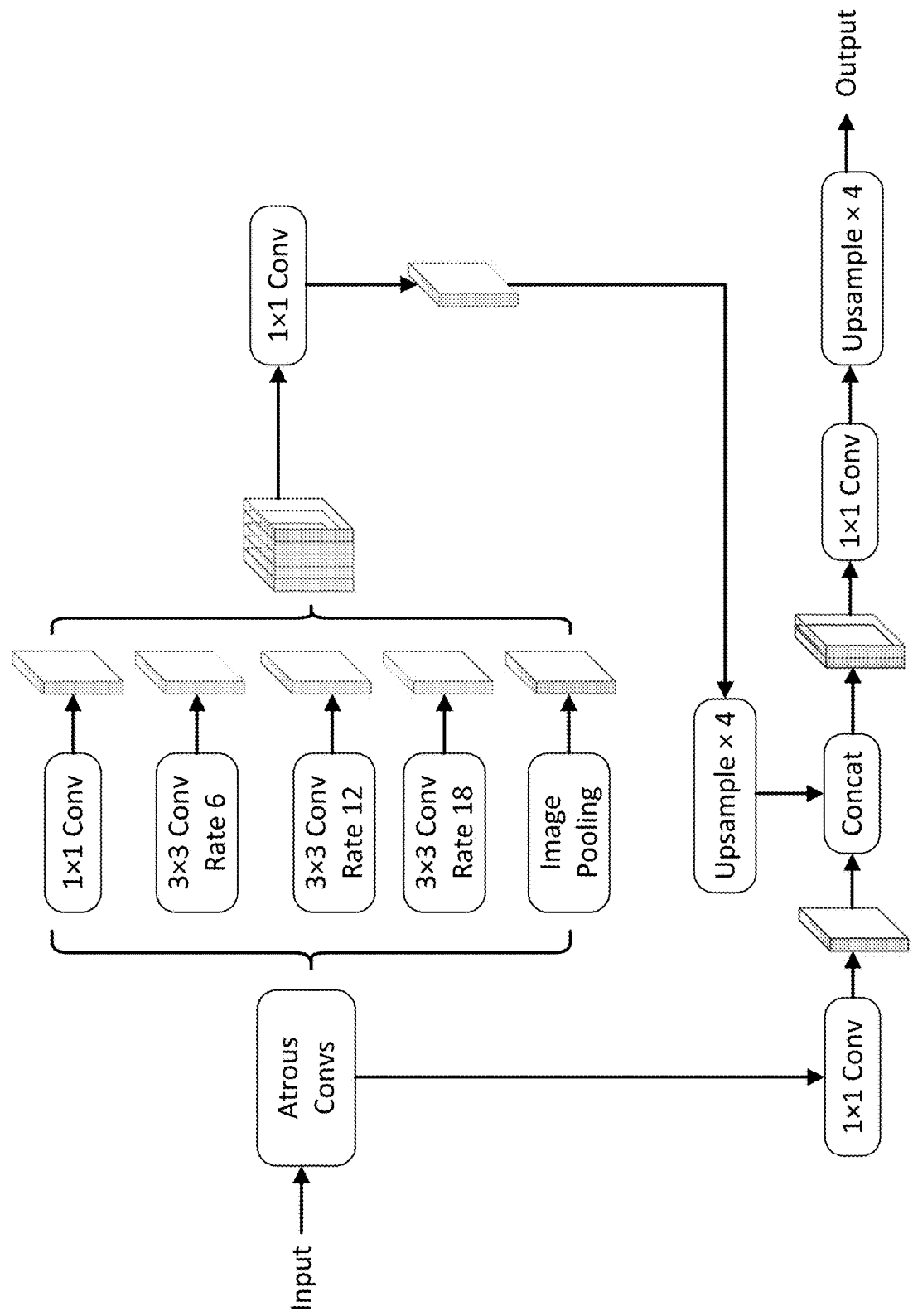
FIG. 5 schematically depicts an architecture for segmentation according to certain embodiments of the present disclosure.

The hand and product segmentation module 122 is configured to, upon receiving the video frames from the video capture module 120, segment the frames to generate accurate hand and product regions for each frame by labeling the pixels, and send the pixel labels of the frames to the hand and product detection module 124 and optionally to the product scanning status recording module 128. The generated accurate hand and product regions are important for understanding the actions of customers. In certain embodiments, the hand and product segmentation module 122 is configured to define four categories of pixels, i.e., hand, product in hand, product on table, and background. In certain embodiments, the hand and product segmentation module 122 may first determine the pixels into background pixels, hand pixels, and product pixels, and then use the depth information to further divide the product pixels into product in hand pixels and product on table pixels. In certain embodiments, the image semantic segmentation algorithms DeepLab v3 is used by the hand and product segmentation module 122 to obtain the pixel labels. FIG. 5 schematically depicts a deep convolutional neural network (CNN) architecture according to certain embodiments of the present disclosure, which is based on DeepLab v3 but contains novel improvement. In certain embodiments, the CNN is trained by collected data with manual annotation. In certain embodiments, considering the limitations of computation resources in embedded devices, the disclosure uses an efficient and powerful architecture instead of a heavy backbone to extract features for hand and product segmentation. In certain embodiments, the efficient and powerful architecture includes MobileNet v2. In certain embodiments, the present disclosure uses cross-entropy loss to train the CNN with the stochastic gradient descent (SGD) algorithm, and the trained CNN is effective to determine the labels for each pixel. After segmentation and merging with depth information, the pixels of the video frames may be simply labeled with numbers 0, 1, 2, 3, where 0 represents background, 1 represents hand or hands of a customer, either empty hand or hand holding a product, 2 represents the product in hand, and 3 represents the product on table. In certain embodiments, the pixels may further include other pixel labels, such as feature vectors, colors, intensities. For the product on table, the bottom surface of the product flushes with and is in contact with the top surface of the table 180. In contrast, the location of the product in hand is generally above the table 180 and does not in contact with the top surface of the table 180. Further, the product in hand, before moving into the table region 192 or after moving out of the table region 192, may have a depth that is below the top surface of the table 180. In certain embodiments, a segmentation algorithm that considers both the two dimensional (2D) image information and the depth information may be used, and the four types of pixel labels may be generated directly from the RGBD images. As described above, the hand and product segmentation module 122 is configured to generate the segmentation result, and send the segmentation result to the hand and product detection module 124, and the segmentation result include four types pixel labels and the depth information of the pixels.

The hand and product detection module 124 is configured to, upon receiving the segmentation result from the hand and product segmentation module 122, detect the hand, the product in hand, and the product on table by generating bounding boxes for the hand and the product, assign a product identification (ID) for each product and optionally a hand ID for each hand, and send the detection result to the product tracking and recognition module 126. The detection result includes product ID and hand ID, bounding box of each ID, pixel labels for the pixels in the bounding boxes, depth of the pixels, and location status of the product or optionally hand. Each bounding box may include a label corresponding to majority of the pixel labels in the bounding box, which are hand, product in hand, and product on table. The labeled pixels can be used to accurately define the products or hand in the corresponding bounding box. For example, a product bounding box includes a large number of pixels, the majority of the pixels may have pixel labels of "product in hand," and some other pixels may have pixel labels of "hand" or "background." The pixels having the labels of "product in hand" can then be used to accurately define the location of the product. The location status is the spatial regions the product or optionally the hand located in. The location status include the scan region 194, the table region 192 excluding the scan region 194, and the ROI 190 excluding the table region 192. When the product is located in the table region 192 excluding the scan region 194, the location status is further divided into "on the table" and "above the table." The location status of on the table means that the product is placed on the table, and bottom surface of the product is in contact with the top surface of the table 180, which could be determined using the depth information. The location status of above the table means that the product is in the table region 192, but is not in contact with the top surface of the table 180, but in the air above the table 180. In certain embodiments, for a t-th video frame, the hand and product detection module 124 may produce detection results as, for example, $D^t = \{d_1^t, \ldots, d_i^t, \ldots, d_k^t\}$, where $d_i^t = (x_i^t, y_i^t, w_i^t, h_i^t)$ is the i- th detection, $x_i^t$ and $y_i^t$ are the coordinates of the top-left corner of the detection, and $w_i^t$ and $h_i^t$ are the sizes of the detection. Kindly note that the other detections other than the i-th detection $d_i^t$ may have been detected from other video frames, and all the detected product in hand from different video frames are listed and recorded. The hand and product detection module 124 is configured to use the segmentation result from the hand and product segmentation module 122 for product detection, and the algorithm the hand and product detection module 124 uses includes connected component analysis algorithm. By utilizing pixel labels of the segmentation result, the hand and product detection module 124 can perform its function more efficiently by estimating the bounding boxes of the hands and products based on the pixel labels, and then refining the bounding boxes. In certain embodiments, the hand and product detection module 124 may also be configured to use the video frames only without using the segmentation result, and the hand and product detection module 124 may fulfill its function using several deep neural network (CNN) based algorithms, such as Faster R-CNN, Mask R-CNN, RefineDet, etc. After obtaining the detection of the hand and products, the hand and product detection module 124 then combines the detection result with the segmentation result. The detection result includes product ID and hand ID, bounding boxes for the product and hand, pixel labels for each pixel in the bounding boxes, depth of the pixels, and location status of the product or hand. After obtaining the detection result, the hand and product detection module 124 is further configured to send the detection result to the product tracking and recognition module 126.

The product tracking and recognition module 126 is configured to, upon receiving the detection result from the hand and product detection module 124, provide a trajectory for each product, and send the trajectories of the products to the product scanning status recording module 128. Specifically, after getting product detections in the current frame $D^t = \{d_1^t, \ldots, d_k^t\}$, the product tracking and recognition module 126 is configured to use the tracking-by-detection framework to produce a trajectory for each newly detected product in hand and update a trajectory for each previously detected product. Let $T^{t-1} = \{T_1^{t-1}, \ldots, T_{n_{t-1}}^{t-1}\}$ to be the tracked trajectories of products at time t−1, where $n_{t-1}$ is the total number of tracked trajectories at time t−1. The product tracking and recognition module 126 is then configured to compute the Euclidean distances between the latest positions of the trajectories of products $T^{t-1}$ and the positions of the products detections $D^t$ at the current frame. After that, greedy search optimization algorithm is used to find the best matches between $T^{t-1}$ and $D^t$ based on the nearest neighbor measure. In this way, updated tracking results $T^t$ are obtained. In certain embodiments, other measurements (e.g., appearance similarities of color or deep features) and association algorithms (e.g., Multiple Hypotheses Tracking, hypergraph-based association, etc.) can also be used to complete the products in hand tracking task. Kindly note the number n may be greater than the number k, since products a customer handles may not all be present in the current video frame.

Further, both the bounding box information and the pixel labels in the bounding box may be used for tracking. The bounding boxes provide the locations of detected products, while the labels of the pixels in the bounding boxes can further define the edges of the products in the bounding boxes for accurate tracking. The combination of bounding box information and pixel label information, as well as the depth information, are especially useful for determining product in hands, since the overlap between the hands and the product in a bounding box may be recognized by labels of the pixels in that bounding box.

Furthermore, the customer may have picked up multiple products in hand at different times, and each of these multiple products has its own trajectory. When one of the multiple product is placed on the table and sit still, the product tracking and recognition module 126 may continue the tracking of the product using a tracking mechanism different from the one used when the product is in the customer's hand. In certain embodiments, the product tracking and recognition module 126 uses an online appearance learning based tracker (e.g., KCF, HoughTracker, and SiamMask) to recognize and track the scanned or unscanned products placed on the table. In this way, the self-checkout application 118 is able to recognize the unscanned products taken away from the scenes. As a result, a trajectory of a product may include several stages or sections, where one section may correspond to the period that the product is in the hand and moves, and another section may correspond to the period that the product is placed on the table 180 and is still, the different sections of the trajectory may be tracked by different techniques so as to balance the accuracy and efficiency of tracking. Each trajectory at least include product ID and product location status at different time points. After obtaining the trajectories, the product tracking and recognition module 126 is configured to send the trajectories to the product scanning and recording module 128, and the trajectories are updated at real time by the product tracking and recognition module 126. In certain embodiments, the product tracking and recognition module 126 may further send the other related detection results to the product scanning and recording module 128.

The product scanning status recording module 128 is configured to, upon receiving the trajectories of the products from the product tracking and recognition module 126 and receiving scanning information from the scanner 150, record scanning status of the products, and send recorded result of the products to the feedback processing module 130. In certain embodiments, the scanning status of the products includes scanned or unscanned. The status of unscanned is a default feature which may be assigned to the product when the product is detected, and the status of scanned may be determined when a specific product is located in the scanning region 194 and roughly at the same time a scanning signal is received by the self-checkout application 118. Further, the locations of the products are also available based on the trajectories or based on the detection results. Therefore, the self-checkout application 118 is able to know whether the product is located in the scanning region 194, the table region 192 excluding the scanning region 194, the ROI 190 excluding the table region 192, and is able to know whether the scanning status of the products is scanned or unscanned. In summary, the recording result at least includes trajectories of the products and scanning status of the products, and after obtaining the recording result, the product scanning statue recording module 128 is further configured to send the recording result to the feedback processing module 130.

The feedback processing module 130 is configured to, upon receiving the recording result from the product scanning status recording module 128, determine a scan difficulty event, and provide a scan difficulty notice to the sales clerk. The feedback processing module 130 is further configured to, upon receiving the recording result and receiving a payment action from the payment device 160, calculate a shoplifting risk score, and provide a shoplifting warning to the sales clerk when the shoplifting risk score is greater than a predetermined threshold.

For scan difficulty determination, the feedback processing module 130 is configured to, when a product has a unscanned status, compute a cumulative time the unscanned product stays in the scanning region based on the trajectory of the product. When the cumulative time is greater than a predetermined time threshold, the feedback processing module 130 is configured to provide the scan difficulty notice to the sales clerk. In certain embodiments, the time threshold is in a range of about 2-30 seconds. In certain embodiments, the time threshold is in a range of about 3-10 seconds. In certain embodiments, the time threshold is 3-5 seconds. In certain embodiments, the time threshold is 3 or 5 seconds. In certain embodiments, the time threshold is customized for a retailer. In certain embodiments, the scan difficulty notice may be sent to a monitor that the sales clerk uses, or may be sent to a pager of the sales clerk. In certain embodiments, the cumulative time is determined from the moment the products is held by the customer's hand. In embodiments, the cumulative time is determined from the moment the product in hand is moved into the scanning region 194. In certain embodiments, the determination of the cumulative time is ended when the product in hand is moved out of the scanning region 194. In certain embodiments, after sending out the scan difficulty notice, the feedback processing module 130 may reset the cumulative time for the product.

For shoplifting determination, the feedback processing module 130 is configured to, when the customer clicks "End" on the terminal 140 and finishes payment on the payment device 160, calculate a shoplifting risk score. If the shoplifting risk score equals to or is higher than a predetermined threshold, the feedback processing module 130 is then configured to send the shoplifting warning to the sales clerk. When the shoplifting risk score is lower than the predetermined threshold, the feedback processing module 130 may send a "normal" message to the sales clerk indicating the scanning process is free of shoplifting. In certain embodiments, the feedback processing module 130 may also keep silent when the shoplifting risk score is low, that is, the feedback processing module 130 does not send any message to the sales clerk.

In certain embodiments, the shoplifting risk is evaluated based on the counts of products that are possibly shoplifted and a total number of products that are likely not shoplifted. The product is defined as possibly shoplifted when it has an unscanned status and the product disappears from the table region 192 or disappears from the ROI 190.

In certain embodiments, when an unscanned product disappears from the table region 192, the action is named a medium risk action, and the medium risk action is assigned with a medium risk factor $r_1$. When an unscanned product disappears from the ROI 190, the action is named a high risk action, and the high risk action is assigned with a high risk factor $r_2$. Here the product disappears from the table region 192 means that in the end of the product trajectory, the product is in the table region 192, and after that, the product is not shown in the later frames and cannot be tracked anymore. The product disappears from the ROI 190 means that in the end of the product trajectory, the product is out of the table region 192 but within the ROI 190, and after that, the product is not shown in the later frames and cannot be tracked anymore. Kindly note that the medium risk action means that the unscanned product disappeared after exits the table region 192. Therefore, if an unscanned product exits the table region 192 and enters the ROI 190, the product can still be tracked and the action is not counted as a medium risk action. The shoplifting risk score for a customer's transaction R is defined by:

$$R = r_1 \times N_1 + r_2 \times N_2,$$

where $N_1$ is the number of unscanned products disappeared from the table region 192, and $N_2$ is the number of unscanned products disappeared from the ROI 190. In certain embodiments, the medium risk factor $r_1$ and the high risk factor $r_2$ are predetermined parameters. In certain embodiments, the value of the medium risk factor $r_1$ and the high risk factor $r_2$ are respectively in the range of about 0.5-1.0 and about 1.0-2.0. In certain embodiments, the value of the medium risk factor $r_1$ and the high risk factor $r_2$ are respectively 0.75 and 1.5. In certain embodiments, when a product exits the table region 192 first, and then disappears from the ROI 190, the product is only counted once in $N_2$, but not counted in $N_1$.

After obtaining the shoplifting risk score R, the feedback processing module 130 is further configured to determine whether there is a shoplifting issue or not by the following criteria:

if $R \geq \beta_1 \times (N_3)^\alpha$, the feedback processing module 130 determines that a shoplifting happened, here $N_3$ is the number of products that have the scanning status of scanned;

if $\beta_1 \times (N_3)^\alpha > R \geq \beta_2 \times (N_3)^\alpha$, the feedback processing module 130 determines that a shoplifting probably happened; and if $R < \beta_2 \times (N_3)^\alpha$, the feedback processing module 130 determines that there is no shoplifting in the customer's transaction.

In certain embodiments, the parameters $\alpha$, $\beta_1$, and $\beta_2$ are predetermined, and $\beta_1 > \beta_2$. In certain embodiments, the present disclosure sets $r_1 = 0.5$, $r_2 = 1.0$, $\alpha = 0.2$, $\beta_1 = 1.0$, and $\beta_2=0.5$. In one example, there are two products that are successfully scanned, i.e., $N_3=2$, if the system detects two medium risk actions and one high risk actions, that is, $N_1=2$, $N_2=1$, then $R=r_1 \times N_1 + r_2 \times N_2 = 0.5 \times 2 + 1.0 \times 1 = 2.0$. $\beta_1 \times (N_3)^\alpha = 1.0 \times (2)^{0.2} = 1.15$. Since $R=2.0>1.15$, the disclosure determines that a shoplifting happened.

In certain embodiments, the feedback processing module 130 may not determine the shoplifting risk soon after the customer starts the payment process. Instead, the feedback processing module 130 may wait for a short period of time, or wait until the customer leaves the ROI 190, because the customer may move some products after payment.

The device manager 132 is configured to manage the terminal 140, the scanner 150, the payment device 160, and the imaging device 170. The management may include defining operation parameters, sending instructions, and receiving collected data. The device manager 132 is further configured to send certain collected data to the corresponding modules. For example, when the device manager 132 receives a start signal from the terminal 140 because the customer clicks start on the terminal 140, or receives a scanning signal from the scanner 150 because the customer scans a product directly without clicking the start on the terminal 140, the device manager 132 may send the signal to the video capture module 120 to initiate a self-checkout event, and the video capture module 120 accordingly starts capturing video frames of the ROI 190. During the self-checkout event, when the device manager 132 receives a scanning signal from the scanner 150, the device manager 132 may send the scanning signal and optionally its time stamp to the product scanning status recording module 128, such that the product scanning status recording module 128 can update the scanning status of the product in the scanning region 194. During the self-checkout event, when the device manager 132 receives an end signal because the customer clicks end on the terminal 140 and finishes payment using the payment device 160, the device manager 132 may send the end signal to the feedback processing module 130 such that the feedback processing module 130 can calculate the shoplifting risk score and determine the shoplifting risk of the self-checkout event.

The user interface 134 is configured to provide a graphic user interface on the terminal 140. The user interface may include buttons of "Start," "End," "Payment," etc. In certain embodiments, the user interface 134 is further configured to provide a graphic user interface on a monitor from the sales clerks site, such that the scan difficulty notice and shoplifting warning can be presented to the sales clerk on the monitor. In certain embodiments, the user interface 134 may also link the scan difficulty notice and shoplifting warning to the sales clerk via a pager system.

The terminal 140 is a display configured to show the graphic user interface provided by the self-checkout application 118. In certain embodiments, the terminal 140 is a touchscreen such that the customer can interact with the self-checkout application 118 efficiently. In certain embodiments, the terminal 140 may be other type of devices that provides customer-system interaction.

The scanner 150 is configured to recognize a product when the product is placed in the scanning region 194 with suitable orientation. In certain embodiments, the scanner 150 may be a barcode scanner using infrared for recognizing the barcode of the product. In certain embodiments, the scanner 150 may be other type of devices capable of identifying the product.

The payment device 160 is configured to recognize a variety of payment methods and charge the customer the amount for the purchased products. The acceptable payment method by the payment device 160 may include credit card, mobile payment, cash, etc.

The imaging device 170 is configured to capture video images of the ROI 190 at real-time and send the captured video images to the self-checkout application 118. In certain embodiments, the imaging device 170 may be an RGBD camera or an RGB camera, such as Intel® RealSense™ Depth Camera D435 and Hjimi 3D Camera IMI A200. When the imaging device 170 is an RGBD camera, the accuracy of the system will be improved with the help of depth information captured by the camera. After capturing the video frames, the imaging device 170 sends the frames to the hand and product segmentation module 122 and optionally to the hand and product detection module 124.

Kindly note the system 100 may further include other components when needed, and not all the component shown in FIG. 1 are necessary for all the applications. For example. The system 100 may include a remote monitor for the sales clerk to view the scan difficulty notice or shoplifting warning, or include a wireless paging system to page the sales clerk the scan difficulty notice or shoplifting warning.

In certain embodiments, the system 100 monitors scan difficulty and shoplifting at real time. In other embodiments, the system 100 may also determine shoplifting with recorded video and scanning signals having time stamps, to check shoplifting at a later time. Under this situation, the self-checkout application 118 may not need all the modules. For example, the video capture module 120 may not be necessary.

In certain embodiments, the computing devices 110 is placed onsite for monitoring shoplifting. In other embodiments, the computing device 110 may also be a cloud server that provides scan difficulty and shoplifting services remotely for a plurality of self-checkout machines.

Figure 6:
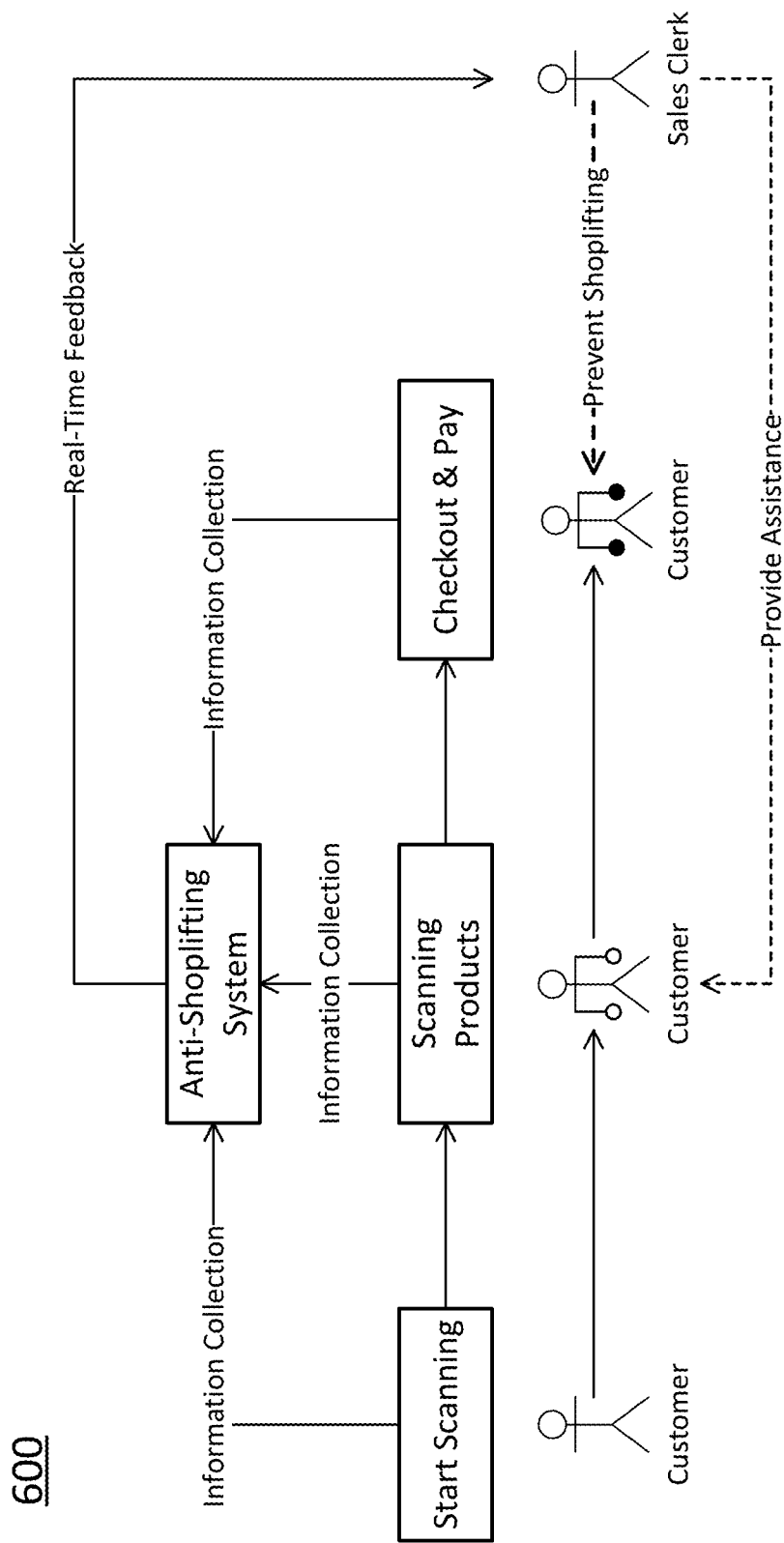
FIG. 6 schematically depicts a conceptual workflow of a self-checkout system according to certain embodiments of the present disclosure.

FIG. 6 schematically shows a conceptual workflow 600 of an intelligent anti-shoplifting system according to certain embodiments of the present disclosure. The system applies a visual solution for anti-shoplifting in self-checkout. As shown in FIG. 6, the anti-shoplifting system collects information of a self-checkout event, from starting scanning to payment, and provides real-time feedbacks (e.g., scanning difficulty, shoplifting, etc.) to sales clerk in the backstage. The sales clerk would take actions based on the feedbacks. In this way, retailers are able to hire only one staff to serve multiple self-checkout machines, which greatly reduces the labor cost and is much more customer friendly. Specifically, from starting scanning, the system automatically detects and tracks all hands taking products and the products on a table, and records the scanning status of the products. Based on the captured scanning status of each product, the system is able to detect the unscanned products taken away from the scene. With the help of the pre-trained product recognition module, the system is able to recognize the stolen products, which is also an important information for the retailer.

Figure 7:
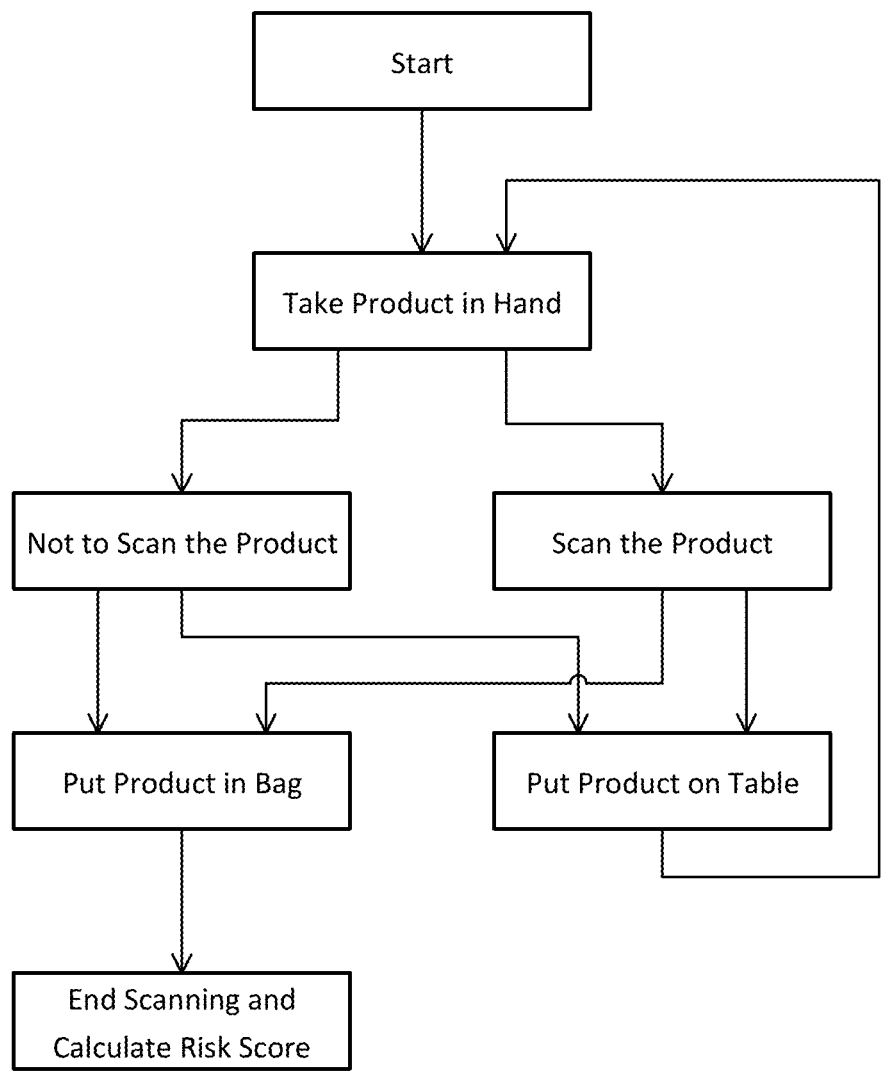
FIG. 7 schematically depicts a workflow of a self-checkout system according to certain embodiments of the present disclosure.

FIG. 7 schematically illustrates a workflow 700 of the systems shown in FIG. 1, 2, 4 or 6 according to certain embodiments of the present disclosure. The workflow 700 is performed by a self-checkout system, and the self-checkout system is in communication with a scanner 150, a payment device 160, and an imaging device 170. The self-checkout system interacts with customers using an interactive graphic GUI on the touchscreen terminal 140.

As shown in FIG. 7, when a customer clicks "Start" on the screen of the self-checkout system, or scans a product or scans a membership card, the self-checkout system receives the signal and recognizes the action, and initializes a new self-checkout event. In the new self-checkout event, the self-checkout system is in communication with the scanner 150 and the imaging device 170. The imaging device 170 then takes video frames, the self-checkout system segments hands of the customer, products on table, product in hand, and background from the frames, detects products on table and product in hand, assigns a status to each of the detected products, and tracks each of the products. For the product in hand, the self-checkout system determines whether the customer has scanned the product in the scanning area, and updates the scanning status of the products when they are scanned. During the above operation, the scanning status and the location status of the product are updated in real time. For the product not scanned and placed on the table region, the customer may pick it up later for scanning, the trajectory of the product is tracked, and the status of the product is updated. When the customer clicks "Payment" to end the shopping process, the anti-shoplifting system analyzes the products based on their scanning statuses and their location statuses, so as to calculates a shoplifting risk score. When there are unscanned products put in the bag or disappeared from the ROI or the table region, the shoplifting risk score would be high, which indicates possibility of shoplifting.

Further, the self-checkout system can measure the accumulated time the customer held the product in the scanning region. When the accumulated time is long, it may indicate that the customer has difficulty scanning the product. Based on the length of the accumulated time, the self-checkout can send a scan difficulty notice to the sales clerk, so that the sales clerk can provide assistance to the customer on scanning the product.

Figure 8:
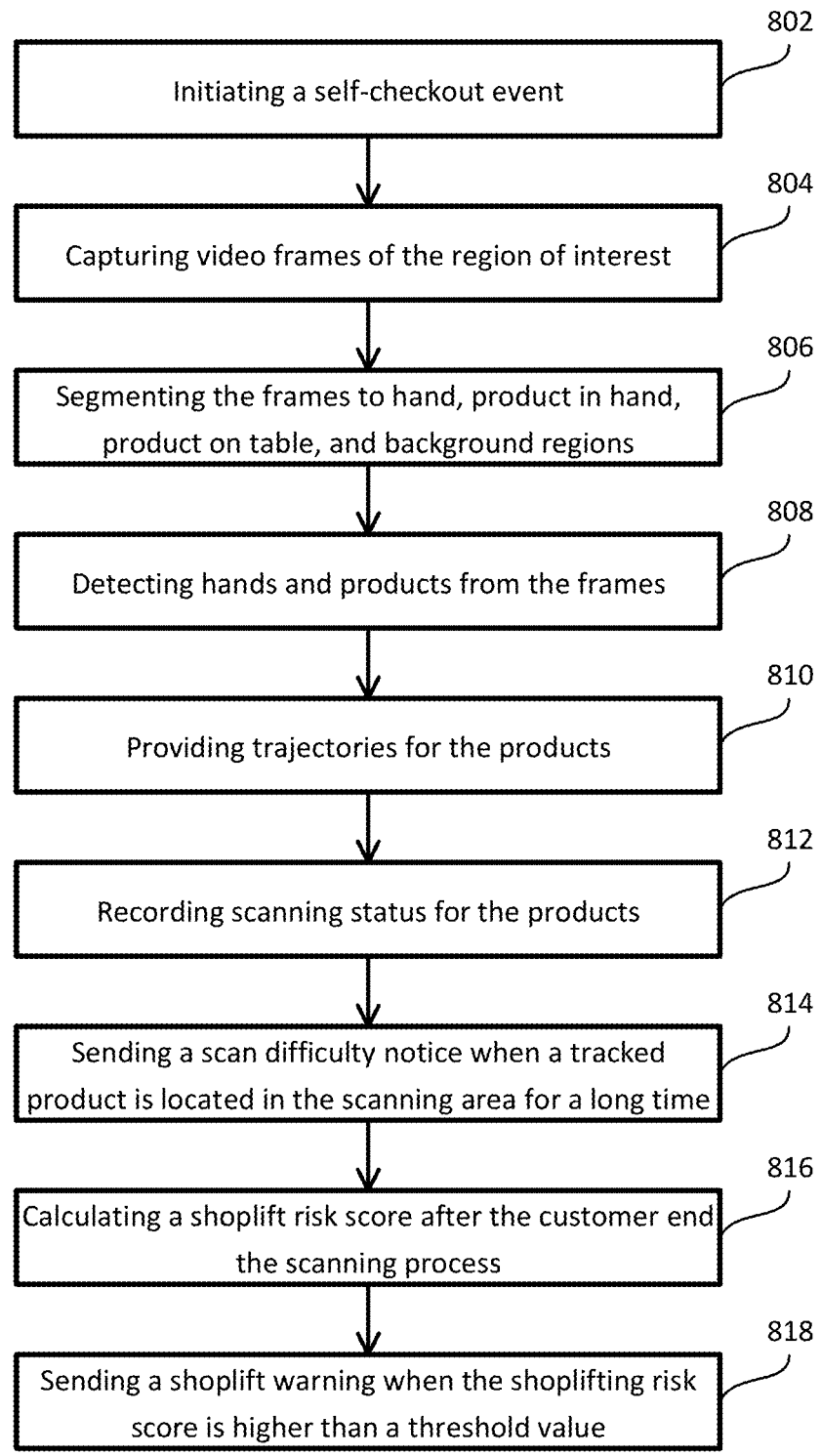
FIG. 8 schematically depict a method of self-checkout according to certain embodiments of the present disclosure.

In certain aspects, the present disclosure relates to a method for anti-shoplifting self-checkout. FIG. 8 schematically depict this type of self-checkout method, which may be implemented by the computing device 110 shown in FIG. 1. In certain embodiments, the method 800 shown in FIG. 8 corresponds to the function of the self-checkout application 118. It should be particularly noted that, unless otherwise stated in the present disclosure, the steps of the method may be arranged in a different sequential order, and are thus not limited to the sequential order as shown in FIG. 8.

As shown in FIG. 8, at procedure 802, in response to a scanning action or a customer's clicking "Start" button on the touchscreen terminal 140, the self-checkout application 118 initiates a self-checkout event. During the initiation of the self-checkout event, the video capture module 120 of the self-checkout application 118 is activated and the activated video capture module 120 sends an instruction to the imaging device 170.

At procedure 804, upon receiving the instruction from the self-checkout application 118, the imaging device 170 captures video frames of the ROI 190, and sends the frames to the hand and product segmentation module 122. In certain embodiments, the imaging device 170 is an RGBD camera or an RGB camera.

At procedure 806, upon receiving the RGBD or RGB video frames, the hand and product segmentation module 122 segments the frames into hand and product regions, and sends the segmentation result to the hand and product detection module 124 and optionally the product scanning status recording module 128. In certain embodiments, the segmentation result includes labels of the pixels. In certain embodiments, each pixel is labeled with one of hand, product in hand, product on table, and background. In certain embodiments, the segmentation is performed using CNN.

At procedure 808, upon receiving the segmentation result, the hand and product detection module 124 detects accurate hand and product regions in the frames, and sends the detection results to the product tracking and recognition module 126. The detection results for each frame may include one or more bounding boxes, the pixel labels, and depth of the pixels, and each bounding box corresponds to a hand, a product in hand, or a product on table. The products and optionally the hand are each assigned with a unique ID. In certain embodiments, since the pixel labels are available, the hand and product detection module 124 can easily determine bounding boxes for hands, products in hand, and products on table based on the pixel labels. In certain embodiments, the hand and product detection module 124 may also detect hand and product regions directly from the video frames without using the segmentation results. In certain embodiments, the hand and product detection module 124 performs the detection using CNN.

At procedure 810, upon receiving the detection results of the video frames, the product tracking and recognition module 126 tracks each product to get a trajectory of the product, and sends the one or more trajectories to the product scanning status recording module 128. As described above, the detection result include location, size and label of each bounding box, labels of the pixels, and depth information. Since the pixels in the bounding box include pixels of the product and pixels of other things such as background, the pixel label makes the estimation of the product in the bounding box more accurate, which helps the tracking process. In certain embodiments, for the bounding boxes in the video frames, the product tracking and recognition module 126 recognizes the products in the first frame which has a unique product ID, and then matches the bounding boxes detected in the second frame to the bounding boxes detected in the first frame. The match may be performed based on the location of the bounding boxes, the size of the bounding boxes, the pixel labels for the pixels inside the bounding box, and the depth information. When one of the bounding boxes in the second frame matches one of the bounding boxes in the first frame, the bounding box in the second frame is assigned with the same product ID as the corresponding bounding box in the first frame. When the bounding boxes having the same ID are detected in a series of video frames, the trajectory of the product is easily determined and tracked. In certain embodiments, a product shows up in the video frames when the customer picks it up and is then tracked. As a result, when the customer picks up multiple products one by one, all these products are eventually tracked by their own trajectories. The trajectories are recorded with a time stamp, such that the location of the products in a specific time is known.

At procedure 812, upon receiving the trajectories of the products from the product tracking and recognition module 126 and optionally the segmentation result from the hand and product segmentation module 122, the product scanning status recording module 128 records or updates scanning status for the products in real time, and sends the trajectories and the dynamic scanning status of the products to the feedback processing module 130. For each tracked product, when the product was in hand and located in the scanning region, the product may be scanned. When the trajectory of the product and the scanning action from the scanner 150 matches, the product is recorded with a status of scanned. When the trajectory of the product and the scanning action from the scanner 150 do not match or there is no scanning action, the product is recorded or keeps a status of unscanned, where unscanned is a default feature for the products.

At procedure 814, upon receiving the trajectories and the scanning status of the products from the product scanning status recording module 128, the feedback processing module 130 calculates the accumulated time a tracked product stays in the scanning region 194, and when the accumulated time is longer than a predetermined threshold, the feedback processing module 130 sends a notice to a sales clerk that the customer has difficulty scanning the current product, such that the sales clerk can go to the self-checkout area to help the customer.

At procedure 816, when the customer finishes the scanning event by click "End" on the self-checkout touchscreen and finishes payment, the feedback processing module 130 calculates a shoplifting risk score based on the status of the products, either scanned or unscanned, either unscanned and disappears from the table region 192 or disappears from the ROI 190.

At procedure 818, when the feedback processing module 130 determines that the shoplifting risk score is higher than a predetermined threshold value, it sends a shoplifting warning message to the sales clerk, so that the sales clerk can take an action to prevent shoplifting.

In certain embodiments, the steps of 816 and 818 may be performed a short time after the customer's payment or until the customer leaves the ROI 190, so as to catch the situation that more unscanned products disappear from the table region 192 or ROI 190 after the payment.

In another aspect, the present disclosure relates to a non-transitory computer readable medium storing computer executable code. The code, when executed at a processer of a computing device, may perform the methods as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

In summary, certain embodiments of the present disclosure provide a visual assisted, anti-shoplifting self-checkout system. By using visual assistance, there is no extra steps the customers need to take, and the system thus is user friendly. Further, the self-checkout system divides the self-checkout area into ROI, table region, and scanning region, and uses different weights for the unscanned product out of the ROI or out of the table region to evaluate shoplifting risks, which makes the estimated shoplifting risk more accurate. Furthermore, the self-checkout system combines segmentation and detection techniques, which facilitates accurate detection and tracking. Moreover, the self-checkout system uses different tracking methods for the tracked products when the products are moving (in hand) and when the products are still (placed on the table), which reduces calculation needs. In addition, the CNN used in the segmentation and detection are specifically designed to have a light backbone, which also reduces the required computing resources. By certain of the above novel design, the self-checkout system can be implemented by a simple embedded system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for self-checkout, comprising a scanner, an imaging device, and a computing device, the computing device comprising a processor and a storage device storing computer executable code, wherein the computer executable code, when executed at the processor, is configured to:
   initiate a self-checkout event;
   instruct the imaging device to capture video frames of a region of interest (ROI), wherein the ROI comprises a table region for placing a product, and the table region comprises a scanning region for scanning the product;
   track the product in the video frames;
   record scanning status and location status of the product, wherein the scanning status comprises scanned and unscanned, and the location status comprises in the table region, and out of the table region but within the ROI;
   in response to receiving a scanning signal from the scanner when the product is placed in the scanning region, record scanning status of the product as scanned;
   calculate a shoplifting risk score based on a number of the product having the scanning status of unscanned and disappear from the table region or the ROI; and
   provide a shoplifting warning when the shoplifting risk score is greater than a predetermined value.

2. The system of claim 1, wherein the computer executable code is configured to, before track the product:
   segment the video frames such that each pixel of the video frames is labeled with hand of a customer, product in hand, product on table, and background; and
   detect the product in hand and the product on table based on the labels of the pixels.

3. The system of claim 2, wherein the computer executable code is configured to segment and detect using a deep convolutional neural network (CNN).

4. The system of claim 1, wherein the computer executable code is configured to track the product using tracking-by-detection and greedy search when the product is the product in hand, and track the product using appearance based tracker when the product is the product on table.

5. The system of claim 1, wherein the shoplifting risk score R is calculated by:

$$R = r_1 \times N_1 + r_2 \times N_2,$$

wherein $N_1$ is a number of the product that has the scanning status of unscanned and disappears from the table region, $N_2$ is a number of the product that has the scanning status of unscanned and disappears from the ROI, $r_1$ is a medium risk factor, and $r_2$ is a high risk factor.

6. The system of claim 5, wherein the medium risk factor is in a range of 0.5-1.0, and the high risk factor is in a range of 1.0-2.0.

7. The system of claim 5, the computer executable code is further configured to:

provide the shoplifting warning that shoplifting happened when $R \geq \beta_1 \times (N_3)^\alpha$; and providing the shoplifting warning that shoplifting might happened when $\beta_1 \times (N_3)^\alpha > R \geq \beta_2 \times (N_3)^\alpha$, wherein $N_3$ is a number of the product that has the scanning status of scanned, $\alpha$ is a predetermined number in a range of 0.29-1.0, $\beta_1$ is a predetermined number in a range of 0.5-1.0, and $\beta_2$ is a predetermined number in a range of 1.0-2.0.

8. The system of claim 1, wherein the computer executable code is further configured to:

provide a scan difficulty message when the product is placed in the scanning region and has the scanning status of unscanned, and the computing device has not received a scanning signal of the product from the scanner for an accumulated time greater than a predetermined time.

9. The system of claim 8 wherein the predetermined time is three seconds.

10. The system of claim 1, wherein the imaging device is a red green blue-depth (RGBD) camera.

11. The system of claim 1, wherein the computing device is an embedded device.

12. A method for self-checkout, comprising:

initiating, by a computing device, a self-checkout event;

instructing, by the computing device, an imaging device to capture video frames of a region of interest (ROI), wherein the ROI comprises a table region for placing a product, and the table region comprises a scanning region for scanning the product;

tracking, by the computing device, the product in the video frames;

recording, by the computing device, scanning status and location status of the product, wherein the scanning status comprises scanned and unscanned, and the location status comprises in the table region, and out of the table region but within the ROI;

in response to receiving a scanning signal from a scanner when the product is placed in the scanning region, recording, by the computing device, scanning status of the product as scanned;

calculating a shoplifting risk score based on a number of the product having the scanning status of unscanned and disappears from the table region or the ROI; and providing a shoplifting warning when the shoplifting risk score is greater than a predetermined value.

13. The method of claim 12, further comprising, before the step of tracking the product:

segmenting, by the computing device, the video frames such that each pixel of the video frames is labeled with hand of a customer, product in hand, product on table, and background; and detecting, by the computing device, the product in hand and the product on table based on the labels of the pixels.

14. The method of claim 13, wherein at least one of the steps of segmenting and detecting is performed using a deep convolutional neural network (CNN).

15. The method of claim 12, wherein the step of tracking the product is performed using tracking-by-detection and greedy search when the product is the product in hand, and performed using appearance based tracker when the product is the product on table.

16. The method of claim 12, wherein the shoplifting risk score R is calculated by:

$R = r_1 \times N_1 + r_2 \times N_2$, wherein $N_1$ is a number of the product that has the scanning status of unscanned and disappears from the table region, $N_2$ is a number of the product that has the scanning status of unscanned and disappears from the ROI, $r_1$ is a medium risk factor in a range of 0.5-1.0, and $r_2$ is a high risk factor in a range of 1.0-2.0.

17. The method of claim 16, further comprising:

providing the shoplifting warning that shoplifting happened when $R \geq \beta_1 \times (N_3)^\alpha$; and providing the shoplifting warning that shoplifting might happened when $\beta_1 \times (N_3)^\alpha > R \geq \beta_2 \times (N_3)^\alpha$, wherein $N_3$ is a number of the product that has the scanning status of scanned, $\alpha$ is a predetermined number in a range of 0.2-1.0, $\beta_1$ is a predetermined number in a range of 0.5-1.0, and $\beta_2$ is a predetermined number in a range of 1.0-2.0.

18. The method of claim 12, further comprising:

providing a scan difficulty message when the product is placed in the scanning region and has the scanning status of unscanned, and the computing device has not received a scanning signal of the product from the scanner for an accumulated time greater than a predetermined time.

19. The method of claim 12, wherein the imaging device is a red green blue-depth (RGBD) camera, and the computing device is an embedded device.

20. A non-transitory computer readable medium storing computer executable code, wherein the computer executable code, when executed at a processor of a computing device, is configured to:

initiate a self-checkout event;

instruct an imaging device to capture video frames of a region of interest (ROI), wherein the ROI comprises a table region for placing a product, and the table region comprises a scanning region for scanning the product;

track the product in the video frames;

record scanning status and location status of the product, wherein the scanning status comprises scanned and unscanned, and the location status comprises in the table region, and out of the table region but within the ROI;

in response to receiving a scanning signal from a scanner when the product is placed in the scanning region, record scanning status of the product as scanned;

calculate a shoplifting risk score based on a number of the product having the scanning status of unscanned and disappear from the table region or the ROI; and provide a shoplifting warning when the shoplifting score is greater than a predetermined value.

* * * * *